Nov. 11, 1958     C. K. BROWN, JR     2,859,502

BLOCK MOLDING MACHINE

Filed April 18, 1952     11 Sheets-Sheet 1

INVENTOR.
CHARLES KEPLER BROWN, JR.

BY Howard J. Whelan.

ATTORNEY

INVENTOR.
CHARLES KEPLER BROWN, JR.

BY Howard J. Whelan.
ATTORNEY

Nov. 11, 1958  C. K. BROWN, JR  2,859,502
BLOCK MOLDING MACHINE
Filed April 18, 1952  11 Sheets-Sheet 7

INVENTOR.
CHARLES KEPLER BROWN, JR.
BY Howard J. Whelan.
ATTORNEY

Nov. 11, 1958

C. K. BROWN, JR 2,859,502

BLOCK MOLDING MACHINE

Filed April 18, 1952

INVENTOR.
CHARLES KEPLER BROWN, JR.

BY *Howard J. Whelan.*

ATTORNEY

Nov. 11, 1958 C. K. BROWN, JR 2,859,502
BLOCK MOLDING MACHINE
Filed April 18, 1952 11 Sheets-Sheet 9
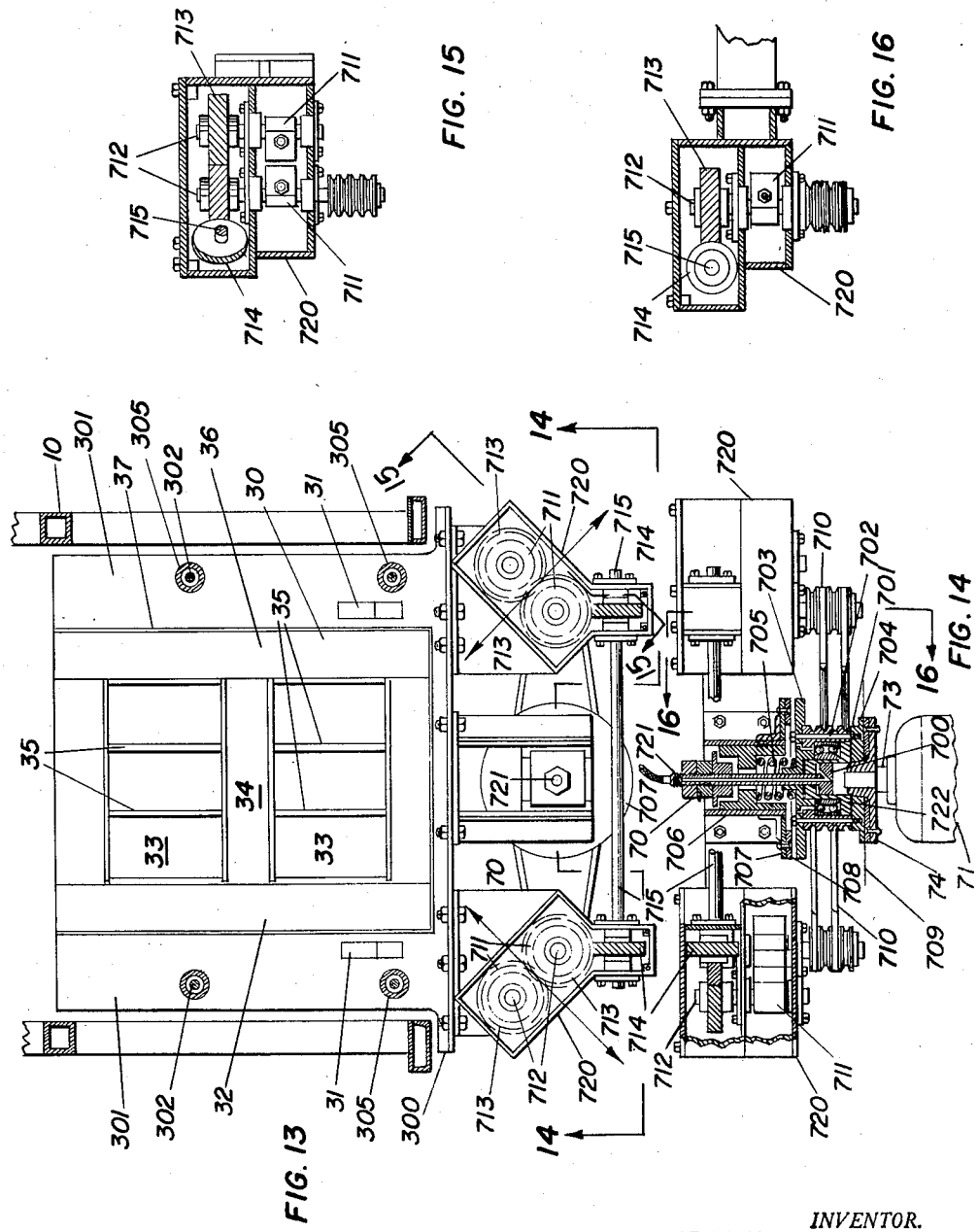
INVENTOR.
CHARLES KEPLER BROWN, JR.
BY Howard J. Whelan
ATTORNEY Nov. 11, 1958

C. K. BROWN, JR 2,859,502

BLOCK MOLDING MACHINE

Filed April 18, 1952

INVENTOR.
CHARLES KEPLER BROWN, JR.

BY Howard J. Whelan

ATTORNEY

Nov. 11, 1958   C. K. BROWN, JR   2,859,502
BLOCK MOLDING MACHINE
Filed April 18, 1952   11 Sheets-Sheet 11

INVENTOR.
CHARLES KEPLER BROWN, JR.
BY Howard J. Whelan
ATTORNEY

United States Patent Office 2,859,502
Patented Nov. 11, 1958

2,859,502

BLOCK MOLDING MACHINE

Charles Kepler Brown, Jr., Fairmont, W. Va.

Application April 18, 1952, Serial No. 283,018

13 Claims. (Cl. 25—41)

This invention refers to machines and equipment for the manufacture of masonry building units and more particularly to that class termed block machines, and employed in the making of concrete blocks, bricks and articles of a kindred nature, moldable from aggregate.

The present invention is a developement of the machine known and described in application for United States Letters Patent Ser. No. 68,603 now Patent No. 2,593,409, by the same applicant. Reference is made to the previous application for the general principles and operation of like machines. The distinguishing features of the present invention over the prior art are outlined in the following parts of this specification. Thus in machines commercially known in the concrete block manufacturing lines, the means for tamping and vibrating the filled molds is arranged in such relation to the other parts of the structure, as to involve interruption of the operations, when the molded unit is ready to be removed to the delivery station or seasoning table. To overcome this interruption, this invention has been designed to include a plural set of molds in a designated plane and spaced apart from each other. In such position one (or more) of the mold boxes are arranged to be vibrated or tamped after filling, by the agitating mechanism of the machine, while another already vibrated and tamped is being manipulated to eject or deposit its block, followed by its removal to the seasoning table and then, as is frequently done, perhaps to the steam chamber for quick setting.

The machine has a vertically and rapidly acting agitator working inside a feed drawer and travelling with it to and fro over and off a mold box. This facilitates the feeding and tamping of the aggregate to the mold box and enables the work to be done fast and effectively. After the aggregate is settled by agitation, tamping and vibration, pressure is provided by a pressure head to compress the aggregate in the mold box. The agitator mechanism comprises a set of grids supported on link bars suitably attached to the piston rods of a set of vertically mounted hydraulic working cylinders. The pistons reciprocate in these cylinders through the intermittent action of their associated control valve means. The grids are raised and lowered, by the piston rods and link bars and load the aggregate into the mold boxes at an accelerated rate.

Other block machines are designed to use vibration or tamping for a fixed time period, and then stop. In a particular instance this time period is determined by the time it takes to size the blocks in the previous cycle of operation. All these methods result in appreciable and unsatisfactory variation in the density of the blocks. These results arise from variation in the characteristics of the aggregate, such as moisture content, weight of sand or chips, type of cement and other items making it up. The density of the block is more uniformly maintained by employing the unique density control feature of this invention and the reactionary force of the vertical agitators in the feed drawer, used as a criterion to determine the vibrating period of each cycle of operation. When the block-like formations of aggregate have reached a predetermined degree of compactness (density) the grids are so obstructed that they no longer sink into the raw aggregate in the molds and are stopped. The reaction force on the grid assembly is measured as the block is compacted. When the block reaches a predetermined degree of density the reaction force on the grid assembly actuates means for continuing the operation of the machine into the next step of the cycle, where the feed drawer is withdrawn from over the mold box and allowing the formed block material to be pressurized and stripped.

Some block machines on the market either tamp the aggregate into the mold box or the mold box is vibrated in a random or haphazard manner and uncontrolled as to direction. In this invention the mold box is vibrated by plural synchronized vibrators operating at high speed. These vibrators impart a compound horizontal rotary movement to the mold box. This unusual movement causes the material to pack or compact densely, uniformly and expeditiously. This is accomplished more effectively than is feasible in previous types of block machines.

The conventional plain pallet machine places its empty pallet in a magazine in the rear of the mold box, and the pallet is fed into the machine mechanically. In this invention, the empty pallets are placed on a lower level (of a plural-level shuttle conveyor) directly under the location of the level or plane from which the loaded pallets are taken from the machine. The empty pallet is fed through under the mold box which is on the upper level, and slides on an incline to a horizontal position directly in back of the molding station on the upper level. It is then fed into position, under the empty mold box in synchronism with the other operations. There it acts like a false platform under the mold box which holds the aggregate while the latter is being compacted by the vibration of the mold box structure. When the molded item is fully compacted, the mold box is lifted up and leaves the molded material erect on the pallet, which is then promptly pushed over to the delivery station. The machine has the pallets so arranged that they follow each other in an organized sequence for each cycle of operation.

In the previous machines, the pallet was not held tightly against the bottom of the vibrating mold, resulting in considerable spillage waste of aggregate and many imperfect blocks. In this invention, the mold box is held under pressure against the pallet thereby preventing such spillage and waste.

Some of the unique structural features of this invention include baffles that reciprocate with the agitators and keep the bar slots covered, adjacent the feed box walls and prevent spillage, a supporting frame for the mold box having draw rods operable in hollow guide tubes giving strength and rigidity, reducing operating space required and allowing freedom of vibratory movement, also an interlocking of the mold box liner plates with a draw bolt method of assembly, clamped within a rigid frame designed to make maintenance easy and less liable to breakage, and strengthened against looseness and undesirable rattling.

A simple and effective clutch and hydraulic brake assembly in the vibrator mechanism, is adapted to provide for positive transmission of power from the motor to the vibrators as well as braking. This provides for instant stopping at the end of a vibrating cycle and avoids the use of electrical brakes or electrical plugging of the driving motor, as incidental to the dampening of the vibration at the same time. The brake arrangement not only stops the vibrators but disengages the clutch contact so the drive motor can run continuously. This invention also arranges the mold box and stripper head so that their center lines are practically coincident while the weight of the vibrators attached to the mold box shifts the center of gravity of the mold box assembly forward and permits the lifting cylinder to be set off center with respect to the mold box. Various heights of blocks up to a predetermined limit can be adjusted by simply installing the proper depth of mold box and raising or lowering the pallet conveyor to suit the requirements. The rigidity of the operating mechanisms to give accuracy to the molding of the blocks is derived from the particular interrelating arrangement of the draw rod, cross-head and bearing means. The term block machine, is intended to comprise the making of cement blocks and other articles.

From the above limited outline of the characteristics of this invention, it will be noted that it includes the following objects.

To provide a new and improved block machine that will avoid one or more of the disadvantages and limitations of the prior art.

Also to provide a new and improved block machine that provides for the making of blocks or articles of aggregative composition, continuously, with a limited requirement of labor to operate it.

Another object of the invention is to provide a new improved block machine that will induce a horizontal vibratory motion that can pack the aggregative material used, in a very effective and multi-directional manner and produce a uniformly distributed and packed aggregate in the blocks that it molds.

A further object of this invention is to provide a new and improved block machine with its pallets held tightly in place and including means to eliminate spillage of the aggregate molded.

Still another object of the invention is to provide a new and improved block machine with its component structures arranged to avoid interference with the processes involved, and the movement of the article being manufactured, from the beginning to the time or part of the cycle where the product is fully molded and ready for removal.

An additional object of the herein described invention is to provide a new and improved block machine that can produce molded articles accurately and substantially intact.

A further object of the invention is to provide a new and improved block machine that can operate with a minimum amount of rattling, endowed with ability to prevent the loosening of components during operation, capacity to operate at a relatively high rate of speed and turn out large numbers of the product in a limited period of time.

A still further object of this invention is to provide a multi-block making machine, with its components spaced to enable free movements during operation without requiring an interruption of any step of the operating cycle, and otherwise cause slowing up or increased stresses and strains in the structures of the mechanisms or products evolved.

Other objects are to provide block machine of the plain pallet type:

(a) That can make blocks in one portion of the machine while removing others just made at another, in a continuous manner.

(b) That will include a vertically acting agitator supported within the feed drawer operating mechanically to feed aggregate into the mold box, and simultaneously exerting pressure on the material without interrupting the vibratory functions of the machine acting in conjunction therewith;

(c) That will function sequentially and automatically in predetermined relation to the density qualities of the aggregate for the molded article during tamping rather than in accordance with a chronological period;

(d) That will provide a method of tamping the aggregate in predetermined synchronism with its vibratory action and in such coordinated cooperation that will expeditiously settle the aggregate in the mold boxes in uniform intimacy;

(e) That will provide for the feeding of empty pallets consecutively and automatically to a station underneath the mold box by means of a reciprocating type of conveyor;

(f) That provides for the rigid holding of the mold box against the loading pallet during vibratory functioning of the machine;

(g) That provides for the cleaning off of excess molding material from the mold box, stripping arrangements of effective and facile operativeness, and of a design that is relatively simple, with components easy to get at for inspection, maintenance and replacement, and including controls for expeditious stopping of the moving parts without danger.

(h) That provides for a pallet supporting frame section of the pallet conveyor under the mold box that is free to move in a horizontal plane in conjunction with the pallet and the mold box and their activated vibration and thereby lessen frictional resistance and wear on the mold box and the spillage of the aggregate; and which is elevated a short distance vertically to clamp the pallet tightly against the bottom of the mold.

(i) That provides the lifting rods of the mechanism used for raising the mold box and pressure heads with protecting sleeves that will prevent grit, soil and debris from resting on them, obstructing their use or causing deterioration.

Since the previous outline has been rather comprehensive, it is believed that those skilled in the art will appreciate the foregoing and additional objects that will be apparent to them from a practical point of view and such details of the structure and principles of the invention are as disclosed herein.

For a better understanding of the invention, reference is made to a preferred form of the invention, shown in the accompanying drawings. The following description, in conjunction with the drawings illustrates and emphasizes the objects of the invention, mentions the general principles thereof, catalogs its components and their functions and explains its operation. The claims indicate the scope of the invention.

Referring to the drawings:

Figure 13 is a plan view, with parts in section, of the mold box, vibrator frame, vibrators and vibrator drive clutch and brake assembly for one end of the machine, refer to Figure 6 for relationship to machine;

Figure 14 is a sectional elevation taken on line 14—14 of Figure 13;

Figure 15 is a sectional elevation taken on line 15—15 of Figure 13;

Figure 16 is a sectional view taken on line 16—16 of Figure 14;

The machine consists of several functional divisions, which are termed as follows:

(1) The hopper and frame structure;
(2) The feed drawer assembly;
(3) The mold box, and stripping mechanism;
(4) Pressure head assembly;
(5) Pallet conveyor assembly;
(6) Vibrator drive and brake and clutch assembly;
(7) Power control system.

The various divisions are separated in this description to outline the elements of their constructions and their general movements or functions, and facilitate a comprehension of the principles under which they operate and manifest advantages derived in their use.

1. Hopper and frame structure

Figure 2:
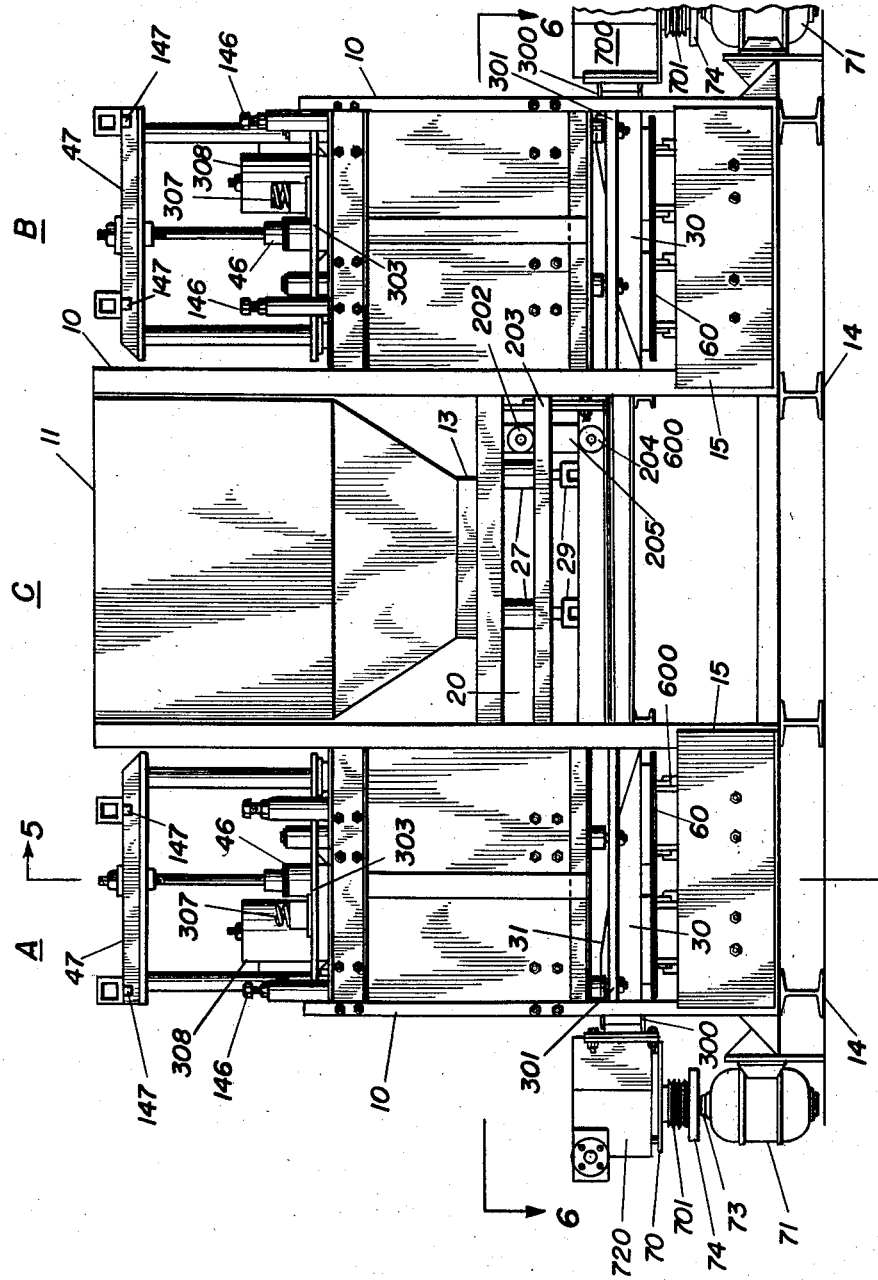
Figure 2 is front elevation of Figure 1.
Figure 3:
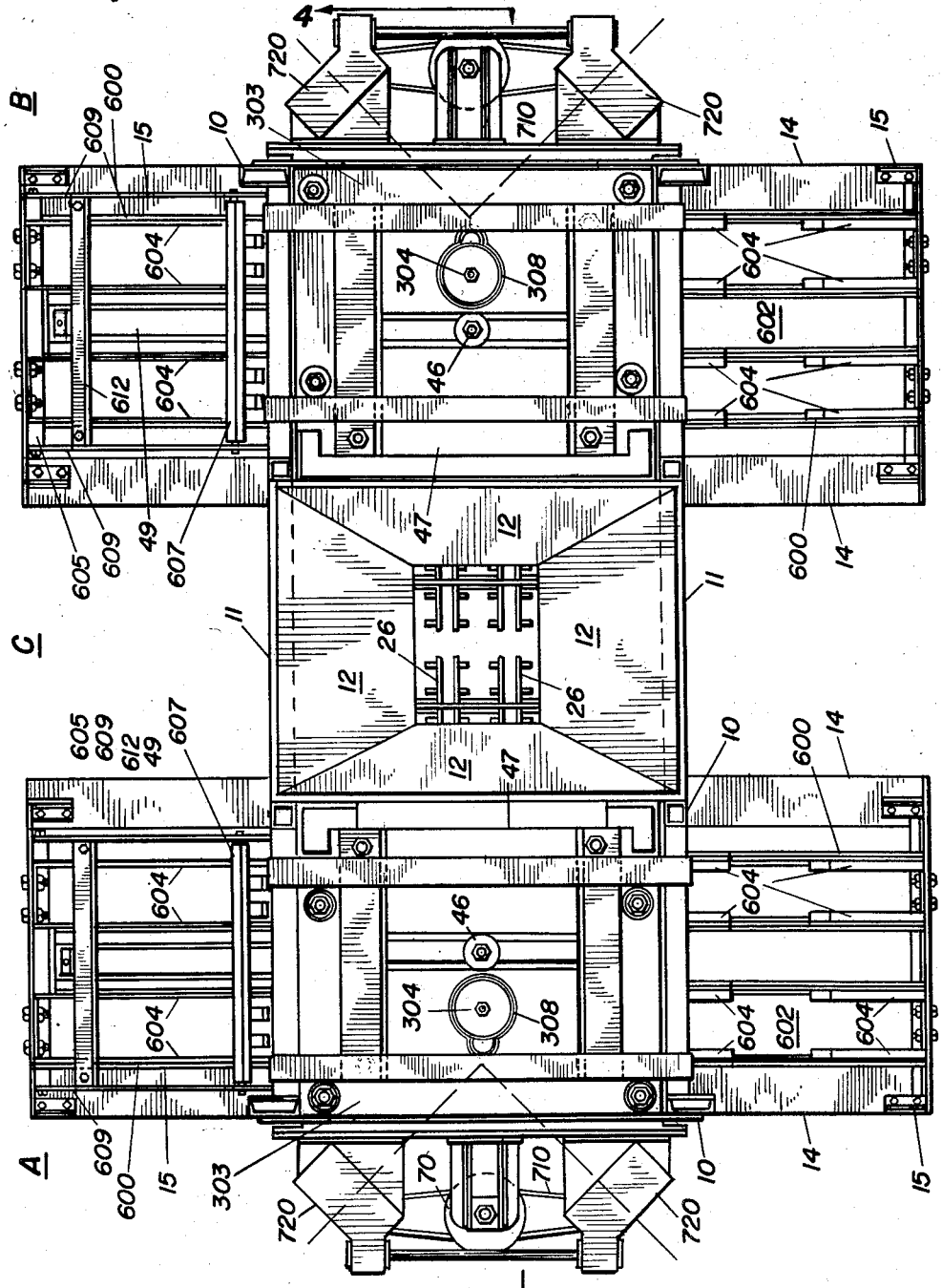
Figure 3 is a plan view of Figure 2.
Figure 4:
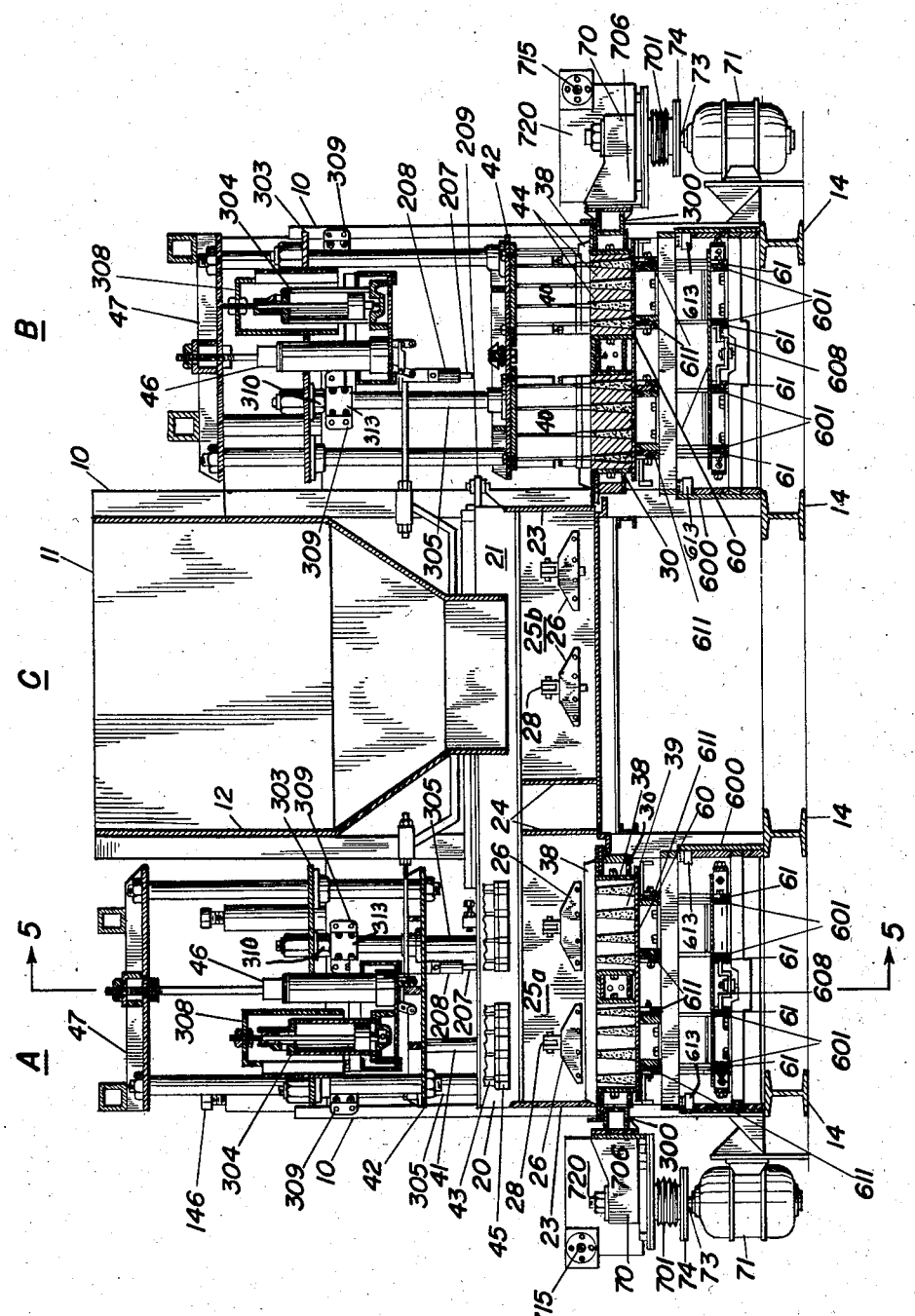
Figure 4 is a sectional elevation on line 4—4 of Figure 3.

The main supporting structure of the block machine used for its general support and assembly consists of a frame 10 of structural work arranged as shown in Fig. 2 to conveniently hold the various components in proper relation to one another and support them and the products they manufacture. At the middle of the structure is installed a raised hopper 11 of substantial size to hold a large quantity of aggregate already mixed and ready for use. The walls 12 of the hopper are slanted at their bottom to facilitate the gravitational pouring of the aggregate and lead it into a rectangular spout 13 of suitable size to cooperatively register with and fill a travelling feed drawer 20. All necessary bolts, welding and other attachments required are used in the construction and employed in a conventional manner. The frame in its use for stationary work is supported on the I-beams 14, resting on and secured to the floor of the building in which the machine is to be operated. The I-beams 14 also support the pallet conveyor. In order to identify the three main sections of the framework and items operably connected therewith, they are termed A, B and C. The section A is that indicated to the left in the drawings, B is to the right, and C is that in between A and B. This is necessary to avoid confusion in referring to the components of like construction, but acting in different phases of the cycle during the operation of the machine. The identification is facilitated in these sections by including the suffix "a" or "b" to the common numeral that points them out. This will be readily appreciated as the description is continued in detail and the functions outlined. The lower edge of the spout is located at a predetermined level above the middle of the frame structure to allow the free movement of the drawer 20 thereunder. Actually the drawer 20 is fed continuously, either at section A or B. The framework 15 of the pallet conveyor is secured and aligned with the frame 10 to suit the levels on which the pallets travel.

2. Feed drawer assembly

Figure 1:
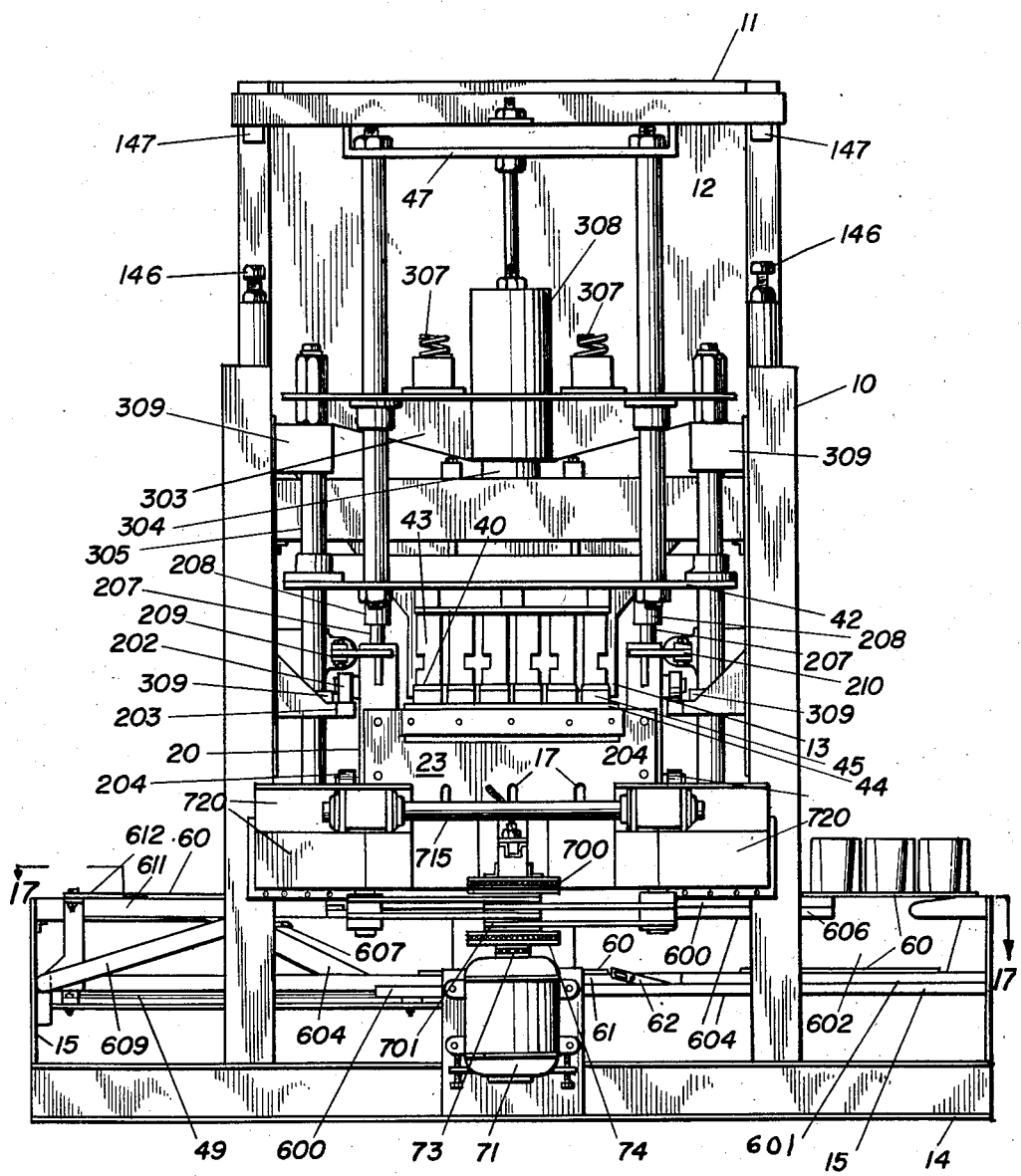
Figure 1 is the side elevation of a duplex block machine embodying this invention.
Figure 9:
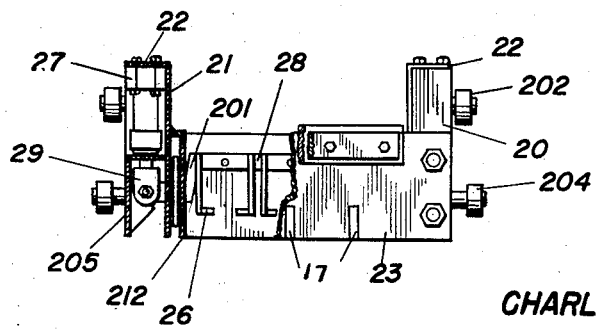
Figure 9 is a sectional view of the feed drawer on line 9—9 of Figure 7.

The feed drawer 20 as shown in Figs. 4, 7, 8 and 9, is a box of a rectangular contour. This component of the block machine functions as a measurer of aggregate, as a carrier from hopper to mold box, and as a loader and packer of aggregate into the mold box. It has vertical side walls 21 at the sides with outwardly turned flanges 22 at their upper edges. The drawer is open at the top as indicated in the drawings to allow the aggregate to flow freely into it from the spout 13, when aligned therewith. The end walls 23 of the drawer are restricted to a predetermined height to permit the rectangular spout 13 to pass over the end walls 23, when the drawer is reciprocated under it, without striking it. A rectangular closed-in box partition member 24 of less height than that of the walls 23 serves as a transverse partition between compartments 25a and 25b of the drawer, as well as to strengthen it. The spout fills one of the compartments at a time, being made long enough to do this. The box partition 24, is low enough in the drawer to miss being struck by the spout during the reciprocation of the drawer; openings 17, Figs. 1 and 9, are left in the end walls 23 to clear core bars.

The flanges 22 serve as supports for the vertically arranged cylinders 27 disposed outside the walls 21. The pistons and piston rods of these cylinders connect with and operate cross bars 28. Clevises 29 on the piston rods enable this to be done and allow for a reasonable amount of play.

The end walls 23 are slotted at 17 to permit the core bars 38 to pass through the drawer when it travels over the mold box 30. Rollers 202 on both side walls of the drawer and mounted on axles journalled on angle plates 205 extending down by the side of these walls, support the weight of the drawer while it is being run on stationary tracks or rails 203 attached to the frame 10, during the horizontal reciprocation of the drawer. Other ramp engaging rollers 204 are likewise mounted on the plates 205 at both ends of the walls 21 and adjacent the lower corners. These rollers work as the end of the feed drawer travels by producing a slight tilt of the drawer as they run up ramp lugs 31 provided on the mold box frame for the purpose. To make this function clear, it is to be understood that one set of rollers 204 on each end of the drawer act at a time, as such set only, contacts the lugs 31 at its respective end of the travel. When the drawer travels in the opposite direction and reaches the end of its movement, it brings the rollers 204 in contact with the ramp lug 31 situated on the opposite mold box. The purpose of this roller and lug arrangement is to positively bring the mold box and drawer into physical contact with each other, and transmit the vibratory action induced.

The feed drawer's function is to receive the aggregate in its two compartments 25a and 25b (one at a time), from the spout 13, and then first to carry the material, from the spout to the mold box in the A section to dump part of its load, while compartment 25b is being filled, then returning compartment 25a back to the spout for further filling, and B section where it dumps a load from the compartment 25b. It returns to the left and repeats the operations as long as the machine is running.

Another function of the drawer 20 is to carry the means to agitate or tamp the aggregate in it. This is accomplished by the operation of tamping grids 26 of special design. These are reciprocated through a small distance up and down, in the aggregate about 500 to 1000 times per minute. The grids are mounted on the cross bars 28 which are actuated by the operation of the cylinders 27. By this agitation the aggregate is quickly ejected from the drawer 20 into the open mold box 30 when it is registered over it. Also the ejection is at first unobstructed because of the emptiness of the mold box, but when the latter is filled the resistance to tamping becomes so great, that the movement of the grids is stopped but they still keep exerting pressure. The pressure from the cylinders 27 being on the grids still produces a force of reaction on the rigid aggregate that tends to and does raise the feed drawer 20 up slightly. In being raised up the drawer 20 reactively presses against a switching plunger 207 in an oil cylinder 208 and through a suitable switch (not shown) an electrical circuit starts the next step in the cycle of operation.

The feed drawer 20 is pulled horizontally from one side of the frame 10 to the other by the hydraulic cylinders 209 coupled to the lugs 210 extending laterally from the flanges 22. All the cylinders 209 are suitably mounted on the frame 10 of the machine, and the mechanism for attaching them to the parts they move need not be further detailed as such will be understood by those skilled in the art.

Where the cross bars 28 pass through the walls of the feed drawer at the side wall slots 220, an extra slide plate 211 is fastened to each so as to slidably cover the opening left by the slot and prevent aggregate from leaking through. The plate 211 is long enough to do this and is disposed at right angles to the axis of the offset portion 201 of the cross bar. In order to enable this plate to reciprocate vertically without wobbling, a false wall 212 is built up close to the side wall 21 of the feed drawer, and kept spaced by suitable spacers. This enables the slide plate to travel freely in the walls of the box without binding. The false wall 212 also acts as a renewable liner for the said drawer, and is of appreciable value in reducing maintenance costs.

3. Mold box and stripper mechanism

Figure 10:
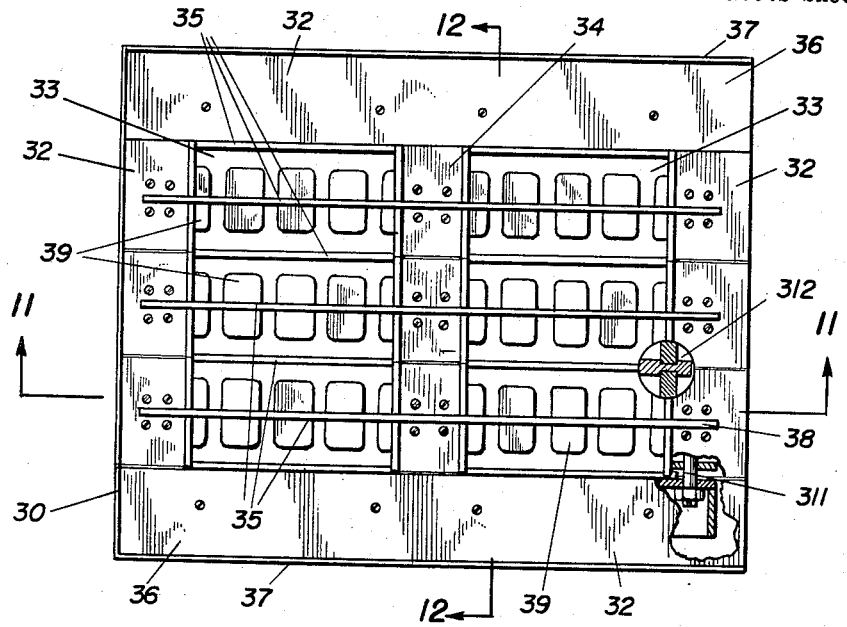
Figure 10 is a plan view, with parts in section, of the mold box.
Figure 11:
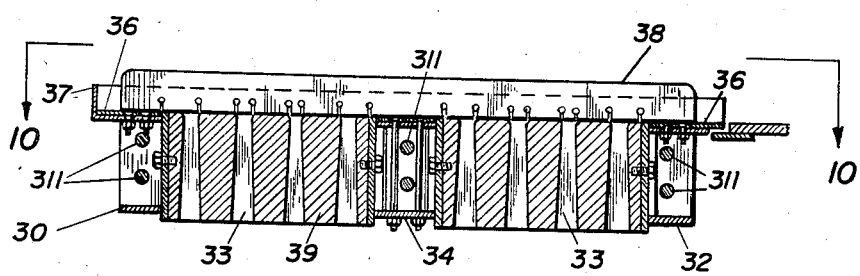
Figure 11 is a sectional view of the mold box taken on line 11—11 of Figure 10.
Figure 12:
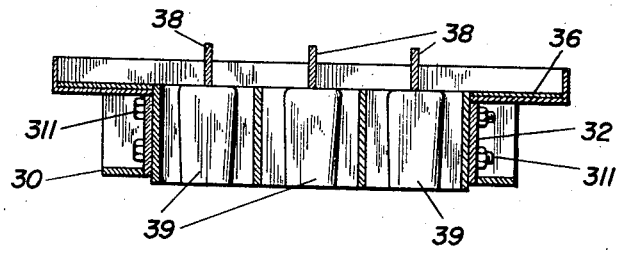
Figure 12 is a sectional elevation taken on line 12—12 of Figure 10.
Figures 17, 18, 19:
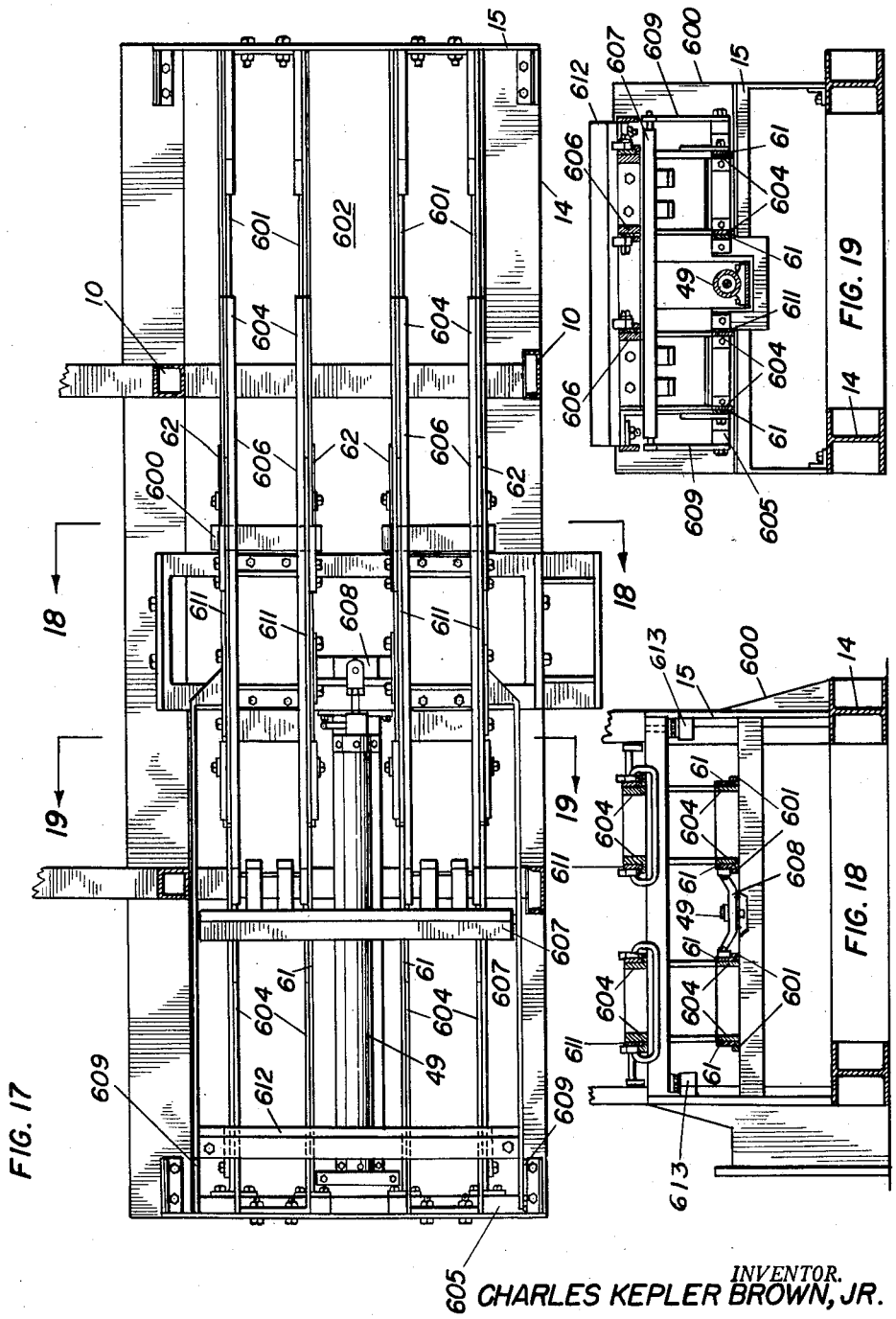
Figure 17 is a plan view of a pallet conveyor taken on line 17—17 of Figure 1.
Figure 18 is a sectional elevation taken on line 18—18 of Figure 17.
Figure 19 is a sectional elevation of pallet conveyor taken on line 19—19 of Figure 17.

The mold box 30 is the piece of apparatus that molds the aggregate into blocks of predetermined shape and size. It consists of a rectangular frame 32 separated into compartments 33 by a partition box 34 transversely arranged across it. The compartments are further divided by liner plates 35 into the number of blocks decided upon. In the machine the mold box shown handles six blocks. The frame 32 is open at the top and bottom. At the top rim an extended tray 36 is integrally connected to the box and has walls 37 deep enough to retain any excess of aggregate that might leak out from under the feed drawer. It is wide enough to allow sufficient leeway for the drawer to register therewith without difficulty. The core bars 38 are of greater depth than the walls 37 and are welded to support the core shells 39 beneath them in the well space of the frame 32. The half cores 310 are preferably bolted on the end walls of the mold box. The mold box liners are of an interlocking construction, see detail 312 shown in Fig. 10, which eliminates many bolts in assembly and makes a tighter box which prevents making of inaccurate blocks.

The mold box 30 has its unique construction intended for practical use and maintenance. The box frame 32 is built with its walls divided up into sections dovetailing and interlocked into each other with the partitions of the box frame 32. They are held together by tie-bolts 311 extending from one side of the box frame 34 to the other and tightened securely under enough pressure to keep the parts from loosening and unlocking. The adjacent edges of the walls are shown in the drawings, to show the construction that brings this about. The side liners are grooved at each end as shown in detail 312 shown encircled in Fig. 10. The end liners are fitted in said grooves and act as spacers against the clamping pressure of the tie-bolts 311 that hold them tightly together. The end liners have projecting lugs that prevent the bolts from sliding out of the grooves.

In order to remove the mold box after the blocks are formed therein, it is lifted vertically up out of the way. The lifting or stripping mechanism consists of an outer frame 300 clamped rigidly and exteriorly to the mold frame 32, and has a peripheral flange 301 along the longitudinal sides. This flange has lifting rods 302 bolted on to it and rising vertically above where they couple to a cross head 303. Adjustments are permissible by providing screw connections as indicated in the construction. A hydraulic cylinder 304 through its piston rod connects to the cross head 303 and raises and lowers it as required. The cylinder is housed in a tubular casing 308 which is welded to the cross head 303. The tubes 305 surround the rods 302 and while keeping the latter relatively clean also provide ample rigidity for the stripper mechanism. Suitable guide bearings 309 are arranged on the frame to keep the cross head and lifting mechanism in line during operation.

4. Pressure head assembly

The pressure head structure 40 is vertically reciprocating and is the part of the apparatus employed in striking the blocks so as to give them a final settlement, and also making their upper faces smooth. It also functions to hold the formed blocks in place on the pallet 60 while the mold box 30 is being stripped from them. It comes into action as the feed drawer 20 is moved off the mold box on one side towards the opposite section. It is lowered or dropped onto the mold box 30 and is accurately registered therewith by means of dowels 41 on it and fitting in to the sleeves 306 in the mold box 30. Then pressure is placed on the pressure plate 42 on which the pressure legs 43 downwardly project. These legs 43 are of such form that their pressure faces 44 on shoes 45 align and engage with the upper face of each block. A cylinder 46 through its piston rod and connections hydraulically presses on the blocks and compresses them slightly, and holds them while the mold box 30 is being raised during stripping. The cylinder 46 is mounted on the frame 10 in a rigid and conventional manner. When the cross head 303 is raised sufficiently, the latter brings its spring tensioned stops 307 into contact with the cross head 47 and raises it. This raises the pressure head a very slight amount, but ample enough to clear the molded blocks.

This is accomplished before the blocks are carried on the pallet from the molding area to the delivery station. The pressure head is raised by cylinder 46 to its original position and cylinder 49 pulls the formed blocks on pallet 60 to the delivery station nearby simultaneously. This tandem operation is started by the contact of the mold box in its elevated position with the limit switch. Hydraulic pressure is provided for the cylinders from a suitable source situated extraneously to the block machine, and not indicated in the drawings, but understood to provide for the needs of the machine. To level the top of the blocks and size them accurately the mold box is first lowered to within about one thirty-second of an inch from the top of the pallet 60 where it comes to rest at a fixed level when a set of stops 310 on the cross head come in contact with stops 313 on the frame. The mold box assumes a fixed position horizontally in the machine and is held there under the positive hydraulic force of the mold stripping hydraulic cylinder 304. Next the pallet is raised and pressed tightly against the bottom of the mold box by short hydraulic cylinders 613 under the pallet support frame, and the pallet 60 assumes a fixed horizontal position in the frame of the machine. When the mold 30 is filled, packed and excess material cut off by the feed drawer 20, the pressure head 40 is forced down to a predetermined height above the pallet where its contacts 147 come to rest on fixed stops 146 located on the frame of the machine. The stops are also electrical contacts that close an electric circuit and stop the vibration and start the stripping action. This method produces blocks that are extremely accurate in height because the bottom edge of the mold box (also the top of the pallet) becomes the reference plane from which the block is sized and this is made possible because the mold box is always brought to a fixed horizontal position in the machine under hydraulic force and is not free to float around vertically as the conventional mold boxes do. With the mold box of this invention in a fixed level position the bottom edge is always at a fixed horizontal level and this edge can be used to accurately locate the pallet 60 so that with the mold box and pallet accurately located the pressure head is aligned as the head is forced down into the mold box. Once the pressure head has reached its fixed level the block is accurately sized because all the variables have been removed.

5. Pallet conveyor assembly

The pallet conveyor assembly 600 provides for the manipulation of the pallets 60 used in this block machine during the manufacture of the blocks. The pallets are of flat material, of suitable thickness to give them strength for the handling of the blocks, from the moment when the aggregate is poured into the mold box, to the time when the formed blocks are made on the pallets and carried away on them to the delivery station.

The pallet conveyor 600 consists of a mechanism mounted within the frame 10 of the machine on foundation "I" beams 14. It carries the pallets 60 from a pallet loading level at station (1). The pallet is introduced to and deposited on the lower level rail platform 601 at station (1) through an opening 602, in the side of the conveyor 600. The pallet is then moved to station (2) directly under the mold box area. It then is run on an inclined ramp to the upper level of the conveyor to station (3). This upper level is in line with the bottom of the mold box in molding position, and to one side of the molding station (4). The next step follows and the pallet is moved to position (4) ready for the mold box to be placed on it and the blocks molded. The block loaded pallet is moved to the delivery station (5) after the molding operations are completed. Each operational movement of the pallet is timed to each cycle of operation of the machine. The pallet moves a step ahead at the proper time in each cycle until it receives its blocks and is then carried away. The empty pallet 60 is taken from station (1) by the hooking and pressure of ratchet dogs 62, on the reciprocating shuttle rails 61 against its back edge. The pallet is slid on the stationary frame rails 604 by this action, and ends the first step of its travel at station (2). The cylinder 49 actuates the moving shuttle rails 61, as well as the other rails carrying the pallet to all the stations. The shuttle rail structure consists of a set of four shuttle rails 61 reciprocating on the lower level of the frame 60, and another set of four shuttle rails 611 and push bar 612 on the upper level. These rails are long bars of rectangular cross section. They are tied in at one end by a cross member 605 to form a rigid structure. The hydraulic operating cylinder mechanism 49 is attached to the cross member through cross bar 608 and two center shuttle bars 61 and reciprocates it. The cylinder is rigidly mounted on the frame 10 and operates under the control of valves actuated in accordance with a designated cycle of operations under which the machine is timed.

Figure 5:
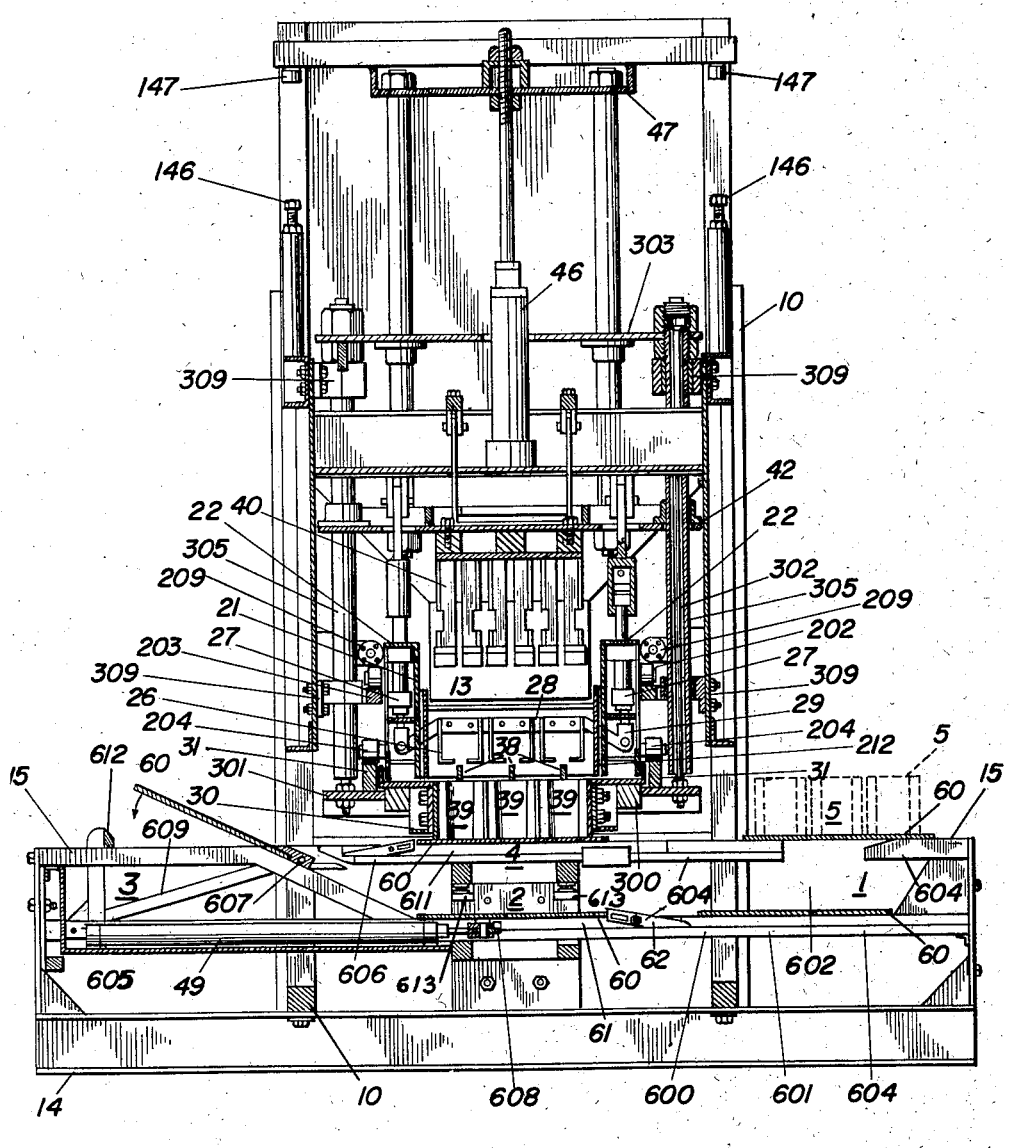
Figure 5 is a sectional elevation on line 5—5 of Figure 4.
Figure 6:
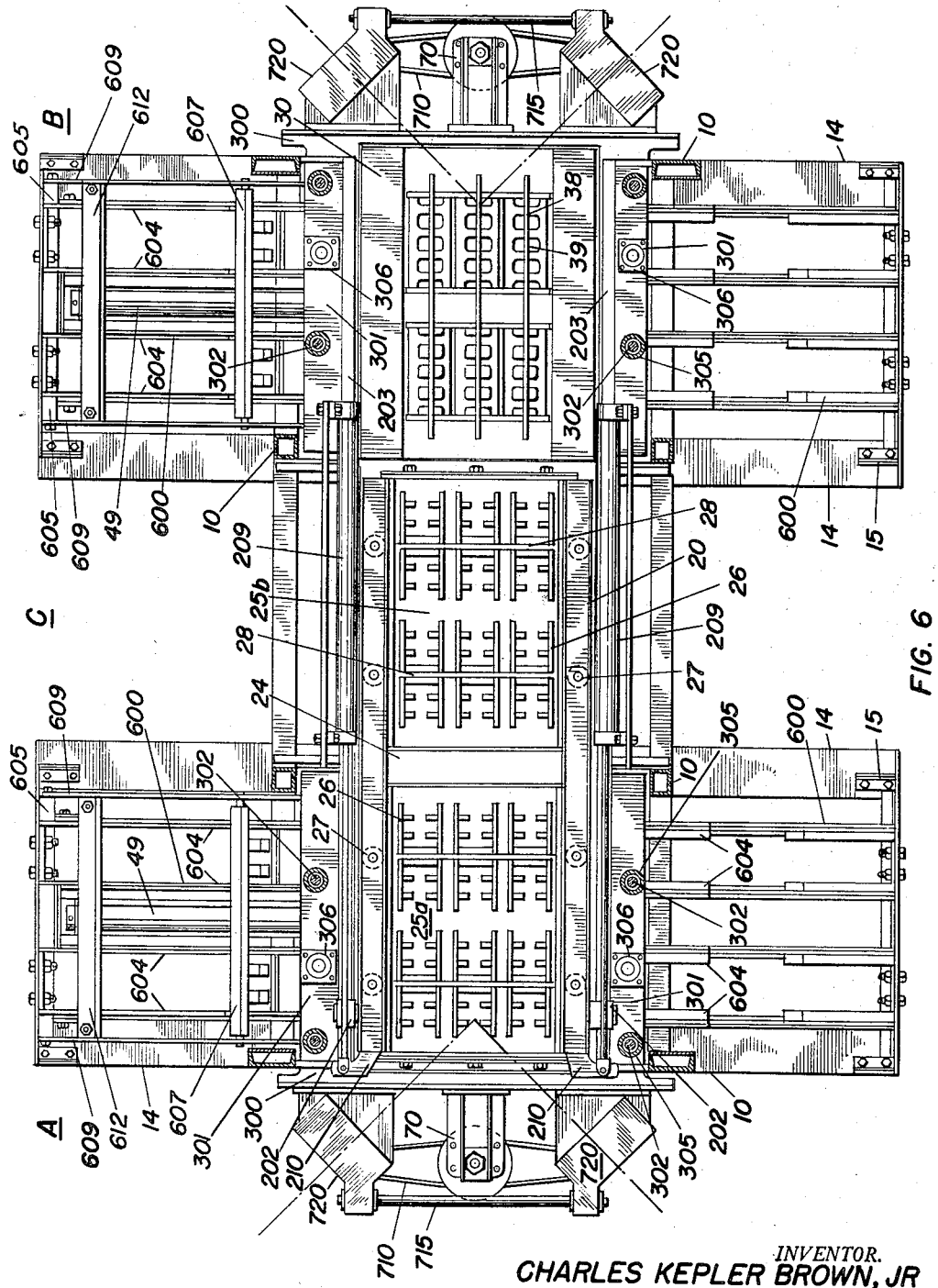
Figure 6 is a sectional view taken horizontally on line 6—6 of Figure 2.
Figure 7:
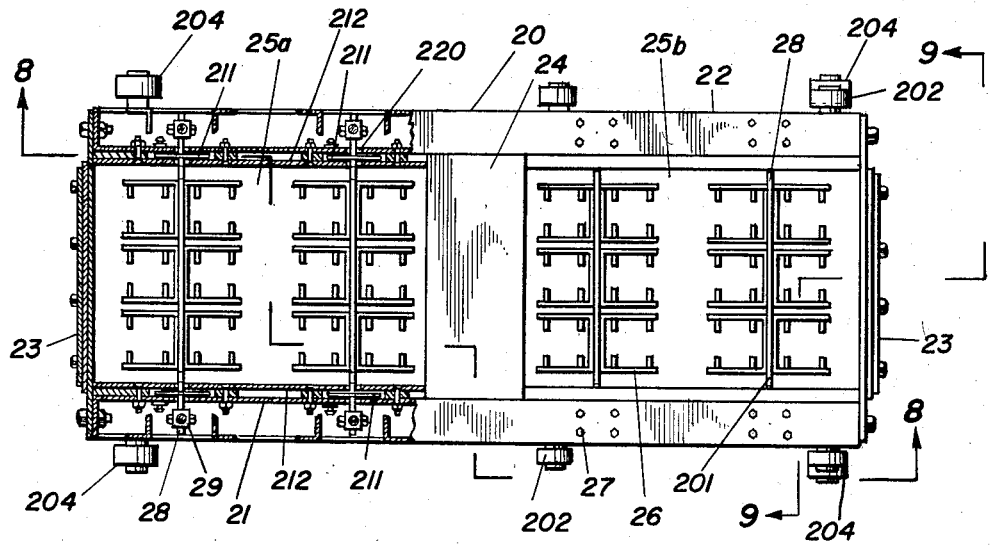
Figure 7 is a sectional plan view in detail of the agitators and feed drawer of this embodiment.
Figure 8:
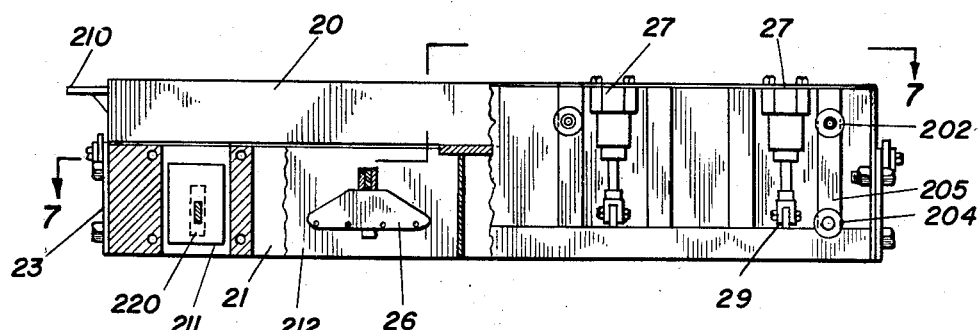
Figure 8 is a sectional elevation of the agitator mechanism and mold box taken on line 8—8 of Figure 7.

The shuttle rail structure slides on the frame rails which keep them in line, and facilitate their movement. The lower shuttle rails 61 with their dogs 62 propel the pallet towards the left of the machine, indicated in Figure 5. Shuttle rails 611, are on the upper level of the structure, where the upper frame rails 606 carry the loaded pallets to the delivery station (5). The pallet 60 is carried from the lower level up an inclined rail portion and deposited on the upper level by a notched drag bar 607 and drag links 609 and thence carried to the molding area of the machine, by push bar 112.

The pallet stops at station (2) for a predetermined period and in the next step is carried up a ramp 64 disposed in its way to station (3) where it is deposited on the upper level, and aligned with the push bar 612. The bar 612 is then ready to move the pallet to station (4) during the next cycle, when the blocks are molded on it. Then later pallet 60 is moved to station (5) in the last cycle, and with the molded blocks on it. Dogs 610 accomplish this last step.

6. Vibration drive, brake and clutch assembly

The vibrator mechanism employed for shaking the mold box 30 under which the pallet is placed during the molding steps, is motivated primarily from a motor 71. This motor 71 is vertically disposed with its shaft 73 holding a clutch drive disc 74. This clutch disc 74 is brought into contact with another similar disc 704 and clutches it in a conventional manner. The disc 704 is suspended on a cylindrical spool 701 and is held by bolts 702 to a rotating plate 703 with incidental bearings, hydraulic piston 700 and pressure spring 705. Over this a slidable housing 706 reciprocates and carries a brake member 707 which is normally spaced from the plate 703 but when the brake is applied the brake lining 708 is brought into action to give the desired frictional resistance to stop the spool 701 and vibrator units 720. The belt member 701 carries two pairs of belts 710 disposed in opposite directions, and each rotating a pair of unbalanced weight sets 711 in vibrator units 720.

Vibrator description

Each vibrator unit 720 has two vertical shafts 712 that are geared together by timing gears 713. The weights 711 are so mounted on shafts 712 that as they rotate in opposite directions they counterbalance themselves during the phases of rotation when they are not nearly parallel. The resultant motion is thus a straight line motion rather than a rotary motion. This straight line is directed through the center of gravity of the vibratory system see Fig. 13. By timing the angular relationship of the "in" and "out" motions of the vibrator units 720 various controlled patterns of vibration may be induced in the vibrating mold. For example, if the vibrator units are operating 90° out of phase with each other the resultant pattern of motion imparted to the mold box will be circular. Or if they are in phase, the pattern will be a straight line longitudinal of the mold box and if they are 180° out of phase the pattern will be a straight line transverse of the mold box. Various other adjustments will give elliptical patterns either longitudinal or transverse of the mold box.

The vibrators are driven and stopped through clutch and brake unit 70 but they are held in preset phase by phase timing gears 714 and phase timing shaft 715. Vibrator shaft timing gears 713 and phase gears 714 and 45° helical cut gears of the proper hand to perform the various timing operations. The shafts are properly supported by necessary bearings in the vibrator housings.

The brake is actuated by injecting oil under pressure down hollow shaft 721 into the cylinder 722. This causes the spool assembly 701 to raise up and simultaneously break contact with clutch motor disc 704 along line 709 and press the rotating brake disc 703 tightly against stationary disc 707 thus very quickly stopping the vibratory action. Vibration is started by releasing the pressure in cylinder 722 and allowing spring 705 to cause the discs 704 and 74 to come in pressure contact again. The brake is automatically released. The motor runs continuously. The pulleys transmitting the power are sized to produce the necessary increase in speed in the weight shafts for this purpose. There is a vibrator assembly for each section, A and B of the machine. The position of the vibrator units and their weights is angular as indicated to produce the circulatory reaction already mentioned. Also to facilitate this action the frame section that supports the pallet 60 is suspended on pins and balls to lessen frictional resistance.

Figure 20:
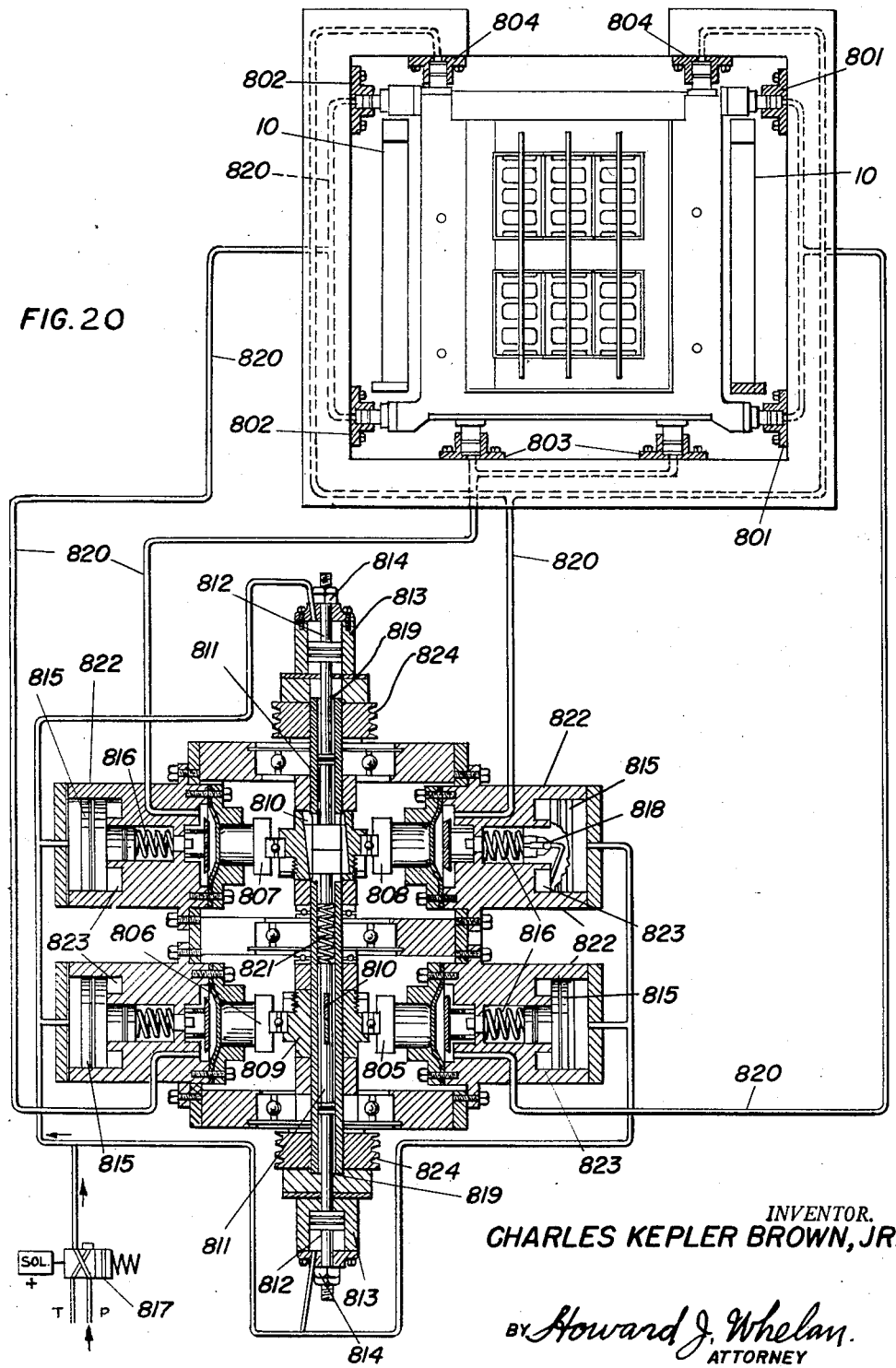
Figure 20 is a plan view of an alternate method of agitator or vibration assembly showing hydraulic driven vibrators that may be used with this device.

Figure 20 shows an alternate method of producing a horizontal rotary patterned vibratory movement to the mold box.

The principal means employed to produce the vibratory movement are hydraulic rams rather than rotary weights. Referring to Fig. 20 it will be seen that short stroke hydraulic cylinder vibratory units 801, 802, 803 and 804 are disposed about the mold box supporting frame in a symmetrical manner. The vibratory units 801 on the right side of the mold box oppose the pair of vibratory units 801 on the left side of the mold box. A pair of vibratory units 803 on the front of the mold box oppose the pair of vibratory units 804 on the back of the mold box. Thus we have a pair of cylinders for producing a motion in any coordinated direction and by properly timing the ram drive cylinders 805, 806, 807 and 808 that are hydraulically linked with the vibratory units 801, 802, 803 and 804 practically any pattern of vibratory movement may be imparted to the mold box.

Eccentric cam 809 being disposed axially a predetermined amount by shifting of wedge key 810 imparts a rapid pumping action to rams 805, 806, 807 and 808. This pumping action does not produce a smooth continuous flow of fluid, but surges the fluid rapidly back and forth in the connecting lines 820. However these surges follow a sine-curve in volumetric measurements and rate of flow through the 360° of cam action on the drive rams. This continuously variable pump delivery from zero to maximum makes possible the smooth reversal of the oil flow that is necessary to produce a high speed small amplitude vibratory movement in the vibratory rams. The drive rams 807 and 808 are located directly opposite each other and are operated by the cam 809 positioned between them. The surge of oil from the ram 807 passes to the vibrator 803 and drives the mold box against the vibrators 804 on the opposite side and forces the oil back into the drive ram 808 opposite ram drive 807, then as the cam 809 crosses the point of maximum actuation of the first ram drive 807 the pattern is reversed and the second ram drive 808 then starts surging the oil into its vibrators 804 and the mold box is moved back in the opposite direction. By having a second set of ram drives 805 and 806 running 90° behind the first set of rams 807 and 808 and connected to a set of vibrators 801 and 802 whose axes are at 90° with the axis of the first set of vibrators 803 and 804 a rotary motion is thus imparted to the mold box. By varying the travel of key 810 in the keyway of the cam 809 the degree of eccentricity can be changed and more or less displacement of the ram drives can be made with a resulting change in the vibratory pattern. Hydraulic cylinders 813 through its piston rod 812 is the actuating means for operating the key 810. The position of the key 810 is controlled by limiting the stroke of the piston rod 812 by adjusting nuts 814. The further the key 810 is allowed to move axially of the shaft 819 the greater the eccentric displacement of cam 809 and the longer the stroke of the drive rams, and as the vibratory stroke is directly proportioned to the ram stroke, the greater the vibratory movement. When the hydraulic pressure is released from cylinder 813, spring 821 extends and moves shaft 811 and the key 810 back to neutral position where the cam 809 is allowed to come to a concentric position with relation to drive shaft 819 and all vibratory movement stops, even though the shaft and cams continue to rotate. Shaft 819 is provided with a pulley 824 and preferably driven by an electric motor not shown.

When hydraulic pressure is applied to cylinder 813 to shift the cam 809 to the eccentric position pressure is also applied to clamping cylinders 815 causing them to shift their pistons 816 toward the center of the drive assembly and thus build up a static pressure in the lines 820. This pressure extends the pistons in the vibrators 801, 802, 803 and 804, causing them to clamp the mold box intimately, thus causing the vibratory movement of the vibrators to be transmitted to the mold box without any loss of motion or rattle and clatter. When the hydraulic pressure is released, the springs 816 cause the piston 815 to retract and draw the oil from the vibrators causing them to release the mold box so that it can be raised up from around the molded blocks as previously described.

A four-way valve 817 controls the travel of the pressurized fluid medium to the cylinders 822 and 813 to simultaneously clamp the mold box between the vibrators and start the vibratory movement. If any leakage occurs during a vibratory cycle the return of the pistons 815 to the release position under pressure of spring 816 will create a slight vacuum in the lines 820 and a replenishing supply of oil will be drawn into the circuit over check valve 818 from the reservoir 823 which is under atmospheric pressure only. This method provides a hydraulic type of vibratory system that is self replenishing, positive and quiet in operation and one in which the length of vibratory stroke can be positively controlled, the vibratory speed controlled and the pattern determined and preset by the proper selection of the vibratory stroke lengths and the speeds.

7. Power control system

The operation of the machine is under the control of an electrical-mechanical system, and a hydraulic system feeding to the cylinders that move the various mechanisms. The electrical mechanical system is operated by selected components of the machine coming into contact with each other to close circuits and operate valves or other means involved in the operation of the parts of the machine in their proper sequence. The last mentioned system also includes the motor and speed changers and included mechanisms for inducing the necessary vibratory action in the mold boxes. The vibratory action is of such high speed as to require special treatment in the design and use of the mechanisms desirable therefor. The machine having plural stations, involved in the manufacture of blocks independently of each other, are tied in cooperatively to keep them operating at predetermined cycles. This necessitates the running of the systems to suit which, while complicated to a certain extent, are within the scope of conventional methods used in machines in general, requiring similar cycles of operation. Therefore it is not deemed necessary to describe the specific control equipment since the cycle of operation can be controlled by equipment well known to those skilled in the art. An outline of the operation however will be useful in reviewing the mode of operation of the machine.

The machine employs two systems for operating the mechanisms that produce the functions required to make the blocks. Hydraulic power from an outside source is employed in the general movements of parts that have a linear travel, and electric power is employed for use in the rotary motor, solenoidic and relay switching actions required. The source of energy for the power is preferably from a regular electric service. The hydraulic system is controlled by suitable valves, which in turn are actuated by electrical circuits opened and closed by stops, plungers and other mechanical means as the components reach predetermined portions of their travels and provide the proper sequence of events. While some of the details of such are mentioned in the specification or indicated in the drawings, it is not deemed necessary to provide the diagram and specific items of such, since the specific make up is not a part of the general construction of the machine, other than to take the place of somewhat complicated mechanical mechanisms that otherwise would have to be employed.

The use of a hydraulic system in the operations of this machine is not intended to be limited to the use of liquids, but rather to include the use of pneumatic media and mechanical movements also, and others that can be practically applied through pipes or ducts. In the electrical system the use of ordinary types of devices applicable for the effective operation can be augmented by those of the electronic type. In such a case the approach of a certain component to a particular point can be employed to induce the operation of its own or other mechanisms to perform the functions required during the next step in the operations, and so on. It is also to be kept in mind that the systems are so interrelated as to enable the plural sections of the machines to operate in the proper sequence and cooperatively.

It is to be understood that an outside source of electricity and of hydraulic pressure with the necessary wiring and piping respectively is provided conveniently to the machine. Also two stations for making blocks are working in proper sequence with one another.

CYCLE OF OPERATIONS

| Steps | Operation | Remarks |
|---|---|---|
| 1 | Feed drawer travels to right (B) and leaves. Left mold box (A) feeds mold box (B). | After filling: Feed drawer is raised by reaction force induced by agitators when density of fill is great enough and switch and valve operate to produce Step 1. |
| 2 | Blocks pressurized in A | After: Pressure head holds the blocks down, stripping starts. |
| 3 | Stripping mechanisms raise mold box but not pressure head for the moment. | Drawer away from A lets stripper work. Then at end of stripping stroke, pressure head starts to rise out of mold box and off of the blocks. |
| 4 | Pressure head rises | Blocks are freed and stay on pallet. |
| 4¹ | Pallet is moved away from molding area. | At the same time an empty pallet moves into place at molding area. |
| 5 | Empty pallet is placed; then mold box is lowered on pallet. | The molding etc. taking place at station B, during the above is now completed and the cycle of operations just described is repeated in and over mold A. |
| 6 | Feed drawer section A is filled and returned back over mold A. | At this time the pallet mechanism is reversed, moving the empty pallets from one conveyor station to another. See Fig. 5. |

The cycle of operations can be further explained by the following paragraphs, without unduly repeating the explanation already given, and enable them to be more fully appreciated.

(1) Mixed concrete aggregate is loaded into storage bin 11 from an outside source whence it flows into and fills the feed drawer 20 through the spout 13.

(2) Loaded compartment A is moved until it is over mold box 30, by the retraction of the piston in shifting cylinder. Compartment B is then charged from the bin because this movement aligns it with the spout.

(3) Reciprocating action of cylinders 104 which are connected to agitator grids 26 cause the grids to rapidly shake the aggregate into the mold box 105a and fill it with the material. This material is subjected to vibration to compact the aggregate.

(4) When the blocks reach predetermined density and solidity the vibration is automatically stopped by the operation of vibrator drive brake. The piston in the shifting cylinder extends causing feed drawer 20 to slide over placing compartment B over mold box 30 and cutting off the excess materials over mold 30.

(5) Pressure head 42 is released by the operation of a catch 88 and drops onto the top of the blocks in mold box 30. Then pressure is exerted through pressure head operating cylinder until the pressure head is forced down to a predetermined level where electrical stops 146 and 147 are contacted.

(6) These stops and their contacts form an electrical circuit on contact operating cylinder to apply brake stopping vibration. The piston in mold stripper cylinder then extends, lifting mold box 30 perpendicularly a distance sufficient to clear the block and leaves them fully formed and compacted on pallet 600.

The machine has a number of unusual but valuable characteristics, in that it provides a substantially continuous supply of blocks as its products, and delivers them in plural places. The arrangements for operating the components of the machine are positive and must act in the proper sequence. Interference is avoided in the movement of the components and access is provided for inspection, replacement and maintenance. Leakage is prevented from the feed drawer and thereby reduces waste, and the possibility of material piling up and getting in the way of parts to cause breakage or deformed blocks. The interruption of the cycles of operation induces an automatic stopping of the machine, which in turn advises the operators of the fact.

While but one general form of the invention is shown in the drawings and described in the specification, it is not desired to limit this application for patent to this particular form, as it is appreciated that other forms of construction could be made that would use the same principles and come within the scope of the appended claims.

Having thus described the invention, what is claimed is:

1. A block molding machine including mold boxes at opposite ends of the machine, an aggregate supply hopper located between the mold boxes and at a higher level than the mold boxes, a feed drawer under the supply hopper having a pair of compartments therein and movable forwardly to a position over the mold box at one end of the machine, and movable rearwardly to a position over the mold box at the other end of the machine to transport aggregate from the hopper and drop it alternately from the compartments to the mold boxes, a pallet support under each of the mold boxes, mechanism that lifts each of the mold boxes from its underlying pallet, stripper mechanism to hold molded blocks down on the pallets during movement of the mold boxes away from the pallets, an automatic means including agitators located in the portions of the feed drawer that move over the mold boxes for controlling the density of said blocks and a device responsive to the pressure of the agitators against the aggregate for initiating operation of the stripper mechanism, said agitators being supported from the feed drawer, and motor means carried by the feed drawer and operably connected to the agitators.

2. A block molding machine comprising a main frame, mold boxes at opposite ends of the frame, supports that hold a pallet under each of the mold boxes, an aggregate supply hopper supported by a frame at a location between the mold boxes, a feed drawer under the supply hopper having a pair of adjacent compartments therein and movable through a stroke, at opposite ends of which the feed drawer overlies one or the other of the mold boxes to charge said mold boxes with aggregate alternately from the compartments, an automatic means including reciprocating agitators carried by the feed drawer and located therein in position to cause the aggregate to drop into a mold box when the feed drawer is over that mold box and for controlling the density of the blocks, and a device responsive to the pressure of the agitators against the aggregate for initiating stripping of the mold boxes from the blocks.

3. An automatic block molding machine comprising a main frame, block molding stations at opposite ends of the main frame, each of said stations including a pallet support and a mold box for resting on a pallet on said support, an aggregate supply hopper supported by the frame between the block molding stations and at a higher level than the mold boxes, a feed drawer supported for reciprocating movement on the frame back and forth from a position in which it underlies the aggregate supply hopper and extends across the top of the mold box, said feed drawer being movable into a second position in which it underlies the aggregate supply hopper and extends across the full width of the mold box at the other end of the machine, power means for that operating the feed drawer back and forth through a stroke from its position over one mold box to its position over the other mold box, mechanism that lifts the mold boxes from the pallets, stripper mechanism for holding blocks on the pallet while the mold box is lifted from the pallet, and automatic means to control the density of the block, said automatic means comprising a reciprocating agitator and motor means that rapidly press the agitator against the aggregate in the mold, and including a device responsive to the pressure of the agitator against the aggregate for initiating operation of the stripper mechanism.

4. An automatic block molding machine comprising a main frame, block molding stations at opposite ends of the main frame, each of said stations including a pallet support and a mold box for resting on a pallet on said support, an aggregate supply hopper supported by the frame between the block molding stations and at a higher level than the mold boxes, a feed drawer supported for reciprocating movement on the frame back and forth from a position in which it underlies the aggregate supply hopper and extends across the top of the mold box, means for moving said feed drawer into a second position in which it underlies the aggregate supply hopper and extends across the full width of the mold box at the other end of the machine, power means for operating the feed drawer back and forth through a stroke from its position over one mold box to its position over the other mold box, mechanism for lifting the mold boxes from the pallets, stripper mechanism for holding blocks on the pallet while the mold box is lifted from the pallet, and automatic means to control the density of the block, said automatic means comprising a reciprocating agitator and motor means for pressing the agitator against the aggregate in the mold, said means also including a device responsive to the pressure of the agitator against the aggregate for initiating operation of the stripper mechanism.

5. A block molding machine comprising a mold box, a support for a pallet on which the mold box rests, a feed drawer means for moving said feed drawer in two opposite positions, in one of which the feed drawer clears the mold box and in the other of which the feed drawer extends over the mold box to supply aggregate thereto, mechanism for lifting the mold box from the pallet to strip the mold box from blocks molded therein, apparatus for controlling the stripping operation of the machine, agitators for feeding and compacting the aggregate in the mold box, said agitators mounted in the feed drawer and carried thereby, a pressure operated device responsive to the pressure of the agitators against the aggregate, and connections through which said device operates the apparatus that controls the stripping operation.

6. A block molding machine, comprising molding stations including mold boxes at opposite ends of the machine, an aggregate supply hopper located between said molding stations and at a higher level than the mold boxes, a feed drawer under the supply hopper, means for moving said feed drawer forwardly to a position over the mold box at one end of the machine, and for moving it rearwardly to a position over the mold box at the other end of the machine to transport aggregate from the supply hopper to the mold boxes, a pallet support under each of the mold boxes, means for lifting each of the mold boxes away from the pallets, stripper mechanism for holding molded blocks against the pallets during movement of the mold boxes away from the pallets, vertically acting agitators in said feed drawer, and means responsive to the pressure of said agitators against the aggregate to control the movement of said feed drawer from a position of filling one of said mold boxes to the opposite position for filling the other of said mold boxes.

7. A block molding machine comprising a main frame, mold boxes at opposite ends of the frame, means for supporting a pallet under each of the mold boxes, an aggregate supply hopper supported at a location between the mold boxes, a feed drawer under the supply hopper, said feed drawer having a pair of compartments therein, means for reciprocating said feed drawer, said feed drawer overlying one or the other of the mold boxes to fill said mold boxes with aggregate from either compartment at the end of each stroke of said reciprocating means, vertically acting agitators in said feed drawer for aiding the discharge of aggregate into said mold boxes, and means for controlling said feed drawer reciprocating means, said control means being responsive to the pressure between said agitators and the aggregate in said mold boxes to cause said reciprocating means to shift said feed drawer from a position to fill one of said mold boxes to a position to fill the other of said mold boxes.

8. A block molding machine comprising a supply hopper, mold boxes on opposite sides of the supply hopper, a feed drawer including a pair of compartments therein, said feed drawer being arranged to reciprocate beneath said supply hopper and above said mold boxes so that said compartments are alternately charged from said supply hopper and discharged into said mold boxes, means supporting a pallet beneath each of said mold boxes, means for stripping said mold boxes from the material deposited therein by said feed drawer to deposit a molded block on said pallet, vertically acting agitators in said feed drawer, said feed drawer being mounted for limited vertical movement, and means responsive to the limited vertical movement of said feed drawer to cause said feed drawer to move from a position for filling one of said mold boxes to a position for filling the other of said mold boxes and to initiate the remainder of the molding process including the operation of the stripper mechanism.

9. A block molding machine as claimed in claim 8 with additional vibration means on each of said mold boxes, said vibration means being arranged to impart at least a pair of horizontal oscillatory forces to said mold boxes, the lines of action of said forces being other than parallel and said vibration means being arranged to act in fixed phase relationship whereby a complex circulatory movement is imparted to the charge contained by said mold boxes.

10. A block molding machine as claimed in claim 9 wherein said pallet supporting means includes reciprocating shuttle means arranged to shift pallets and the molded blocks carried thereupon in a direction transverse to the motion of said feed drawer.

11. A block molding machine comprising, a supply hopper, mold boxes on opposite sides of said supply hopper, a feed drawer including a pair of compartments therein, said feed drawer being arranged to reciprocate beneath said supply hopper and above said mold boxes so that said compartments are alternately charged from said supply hopper and discharged into said mold boxes, each of said compartments having a vertically movable tamping grid therein, means for moving said tamping grids vertically, said feed drawer being mounted for limited vertical movement, and means responsive to limited vertical movement of said feed drawer to shift said feed drawer from a position covering one of said mold boxes into a position covering the other of said mold boxes.

12. A block molding machine as claimed in claim 11 with additional vibrating means on each of said mold boxes, said vibrating means being arranged to impart at least a pair of vibratory forces acting solely along horizontal lines which intersect substantially at the center of gravity of said mold boxes, said pair of vibratory forces acting in fixed phase relationship whereby a complex circulatory movement is imparted to the charge contained by said mold boxes, and pallet supporting means beneath each of said mold boxes, said last named means including a mechanism for shifting the pallets and molded blocks thereon in a direction transverse to the motion of said feed drawer.

13. A block molding machine as claimed in claim 11 with additionally, means for stripping finished blocks from said mold boxes and means responsive to the vertical dimension of the blocks within said mold boxes for initiating the operation of said stripping mechanism.

References Cited in the file of this patent
UNITED STATES PATENTS

| | | |
|---|---|---|
| 27,726 | Lewis | Apr. 3, 1860 |
| 1,341,798 | Graham | June 1, 1920 |
| 1,796,636 | Toulmin | Mar. 17, 1931 |
| 1,905,975 | Thomas | Apr. 25, 1933 |
| 2,036,367 | Shinn et al. | Apr. 7, 1936 |
| 2,275,676 | Gelbman et al. | Mar. 10, 1942 |
| 2,308,132 | Wellnitz | Jan. 12, 1943 |

(Other references on following page)

UNITED STATES PATENTS

| | | |
|---|---|---|
| 2,407,168 | Lindkvist | Sept. 3, 1946 |
| 2,492,297 | Lagarde | Dec. 27, 1949 |
| 2,496,016 | Nelson | Jan. 31, 1950 |
| 2,513,028 | Lagarde | June 27, 1950 |
| 2,581,579 | Davis | Jan. 8, 1952 |
| 2,583,597 | Ryner | Jan. 29, 1952 |
| 2,587,413 | Vander Heyden | Feb. 26, 1952 |
| 2,640,579 | Schutt | June 2, 1953 |
| 2,651,827 | Oswolt | Sept. 15, 1953 |
| 2,652,613 | Warren | Sept. 22, 1953 |
| 2,685,116 | Schutt | Aug. 3, 1954 |